UNITED STATES PATENT OFFICE.

EMELINE C. SUMMERHAYES, OF SOMERVILLE, MASSACHUSETTS.

TOILET LOTION.

SPECIFICATION forming part of Letters Patent No. 415,849, dated November 26, 1889.

Application filed August 16, 1889. Serial No. 321,019. (No specimens.)

*To all whom it may concern:*

Be it known that I, EMELINE C. SUMMERHAYES, a citizen of the United States, residing at Somerville, in the county of Middlesex and State of Massachusetts, have invented certain new and useful Improvements in Medicinal Compounds Known as "Toilet Lotions;" and I do hereby declare the following to be a full, clear, and exact description of the invention, such as will enable others skilled in the art to which it appertains to make and use the same.

This invention pertains to certain new and useful improvements in medicinal compounds, having for its object the production of a lotion, salve, or ointment for application to scalds, burns, scratches, cuts, sores, &c., resulting in a rapid healing of the injured or affected parts.

My improved compound is composed of the following ingredients: gum-tragacanth, two and one-half ounces; Farina cologne, three gills; glycerine, two and one-half ounces; lavender-water, one-half gill; boracic acid, one ounce; bay-rum, four ounces; alcohol, two ounces; water, six pints.

In the preparation of my compound I first dissolve the gum-tragacanth in soft water, which is preferably rain or snow or distilled water not previously in contact with lead or copper pipes. After the gum is thoroughly dissolved or macerated I strain it two or three times through a fine strainer and then beat in the glycerine and boracic acid. These ingredients I then let stand for several hours, and then the remaining liquids composing my invention are added thereto, and the whole is well and continuously beaten until all the ingredients thoroughly blend or are reduced to a homogeneous mass. Thus a thick cream is produced ready for use, the same being preferably placed in bottles of divers sizes. In mixing this compound the utensils used are preferably of porcelain wire, and all metallic vessels are entirely avoided.

A lotion thus produced is a very valuable application for sores, burns, scratches, &c., its healing and soothing properties being manifest.

I claim as my invention—

The herein-described medicinal compound or lotion, consisting of gum-tragacanth, Farina cologne, glycerine, lavender-water, boracic acid, bay-rum, alcohol, and water, in about the proportions stated, and for the purpose set forth.

In testimony whereof I affix my signature in presence of two witnesses.

EMELINE C. SUMMERHAYES.

Witnesses:
LEANDER COBB,
J. W. SUMMERHAYES.